United States Patent [19]
Byers, Jr.

[11] 3,893,471
[45] July 8, 1975

[54] PRESSURE COMPENSATING FLUID CONTROL VALVE

[75] Inventor: James Otto Byers, Jr., Racine, Wis.

[73] Assignee: Tomco, Inc., Racine, Wis.

[22] Filed: Oct. 4, 1973

[21] Appl. No.: 403,509

[52] U.S. Cl. .................... 137/106; 91/420; 91/433
[51] Int. Cl. ............................................ F16k 11/07
[58] Field of Search ........ 91/420, 433; 137/85, 106, 137/596.18, 625.62

[56] References Cited
UNITED STATES PATENTS

| | | | |
|---|---|---|---|
| 2,654,348 | 10/1953 | Beck | 91/420 |
| 2,909,195 | 10/1959 | Keyt | 91/433 X |
| 3,260,273 | 7/1966 | Hayner | 137/85 |

Primary Examiner—Robert G. Nilson
Attorney, Agent, or Firm—Ronald E. Barry

[57] ABSTRACT

A proportional pressure compensating hydraulic control valve having a valve body and a valve spool mounted in the valve body for movement from a neutral or open center position wherein fluid flows through the valve body to an operating position wherein the flow of fluid through the valve is restricted to direct inlet fluid through a flow control orifice to a pressure passage within the valve body, the pressure passage being connected to one of a pair of cylinder passages, the other cylinder passage being connected to a tank passage. The valve spool in an open center mode controlling the flow of fluid to the control orifice and being pressure compensated to maintain a predetermined flow rate through the control orifice, pressure compensation being achieved by imposing inlet and pressure passage pressures selectively to each end of the valve spool so that the valve spool responds to the pressure differential across the control orifice. The valve spool in the closed center mode restricts the fluid flow between the pressure passage and the cylinder passage. The flow rate between the inlet passage network and the pressure passage is controlled either by a low force proportional solenoid valve assembly or a mechanically actuated assembly.

25 Claims, 9 Drawing Figures

PRESSURE COMPENSATING FLUID CONTROL VALVE

SUMMARY OF THE INVENTION

The proportional pressure compensating hydraulic valve of the present invention is provided with means for predetermining the maximum flow rate through the valve and pressure compensating assemblies to maintain the flow rate through the valve. The pressure compensating assemblies include a pair of pistons or balls located at each end of the valve spool which are biased to hold the valve spool in a neutral position. Each of the pressure compensating assemblies is subjected to inlet pressure in the neutral position of the valve and are interconnected through the pressure passage in the valve to maintain a balanced pressure relationship across the valve spool. The valve is actuated by selectively venting one or the other of the compensating assemblies to produce a pressure differential across one of the pistons or balls which will cause the ball to move against the bias of the corresponding spring allowing the compensating assembly at the other end of the valve spool to move the valve spool towards an operating position. Through a series of passages, inlet fluid pressure is selectively maintained on the one pressure compensating assembly and pressure passage pressure is selectively maintained on the other pressure compensating assembly so that the pressure differential across the valve spool is fixed by the bias spring and the flow rate is fixed by the control orifice. Any variation in the flow across the control orifice will produce a variation in the pressure differential across the valve spool which will cause the valve spool to compensate for the differential pressure error.

An electro-hydraulic assembly can be used to establish the flow rate through the control orifice. The electro-hydraulic assembly includes a low force proportional solenoid in which hydraulic forces have been balanced and frictional forces have been reduced to a minimum. The control orifice is set by a valve element in the electro-hydraulic assembly which controls the position of a poppet valve member in accordance with the pressure differential across the control orifice.

DRAWINGS

DESCRIPTION OF THE INVENTION

Figure 1:
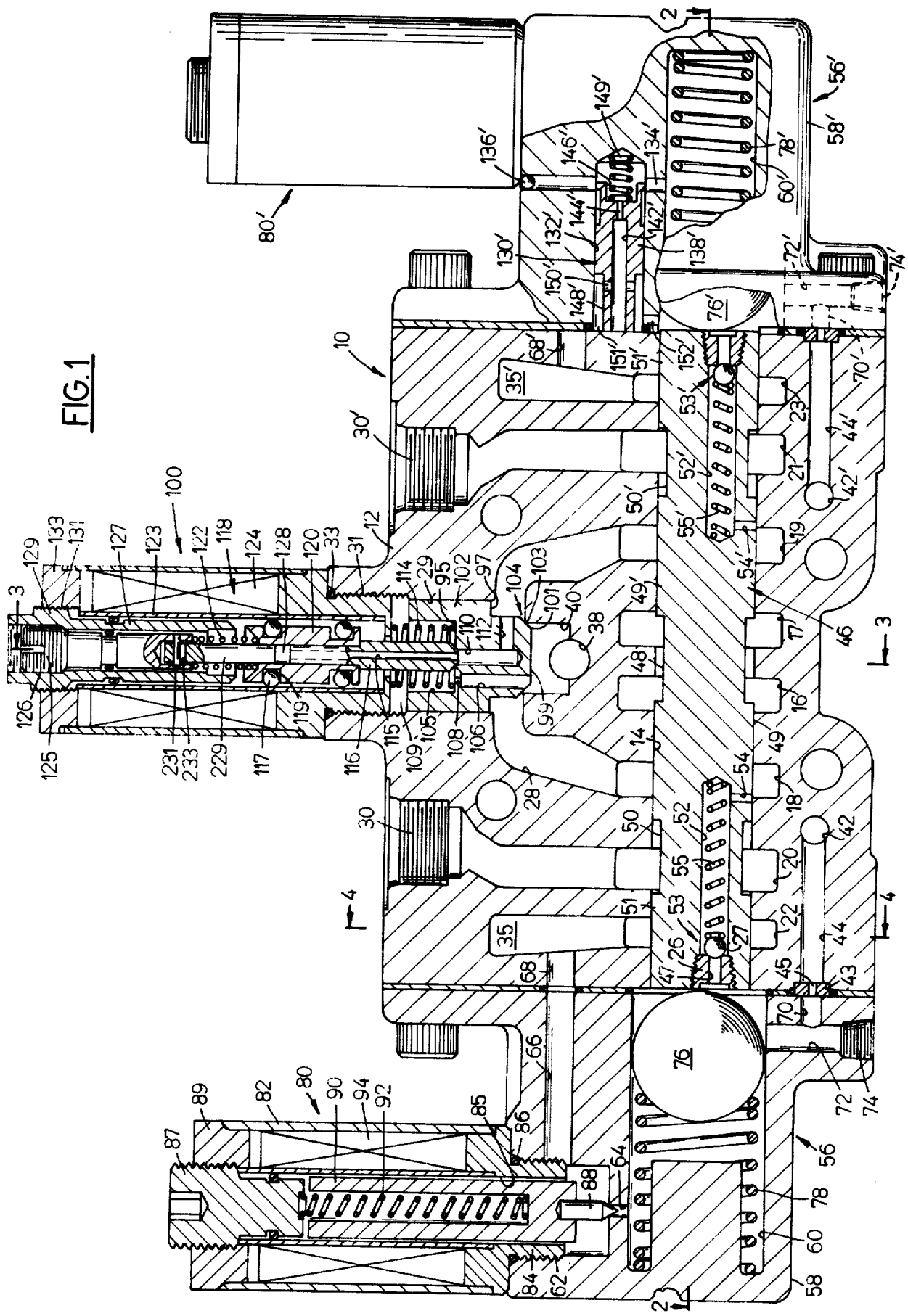
FIG. 1 is a front elevation view in section of the pressure compensating proportional flow, four-way control valve with one of the pressure compensating assemblies partly broken away to show the flow restricting piston assembly.

The proportional pressure compensating hydraulic control valve of this invention generally includes a valve housing 10 having a valve spool or element 46 which is movable from a neutral position in either direction to an operative position. In the neutral position fluid will flow from a fluid inlet passage network 24 through the valve to tank through discharge passages 26. When the valve is used in an open center mode as shown in the drawings, the valve spool 46 in the operative position will restrict the flow of fluid through the valve and direct fluid from the fluid passage network 24 to a pressure passage 28, the pressure passage being connected to one of a pair of cylinder passages 30, the other of the cylinder passages 30' being connected to one of the tank passages 32'. When the valve is used in a closed center mode, the valve spool 46 will restrict flow between the pressure passage and the cylinder passage 30 or 30'.

Figure 8:
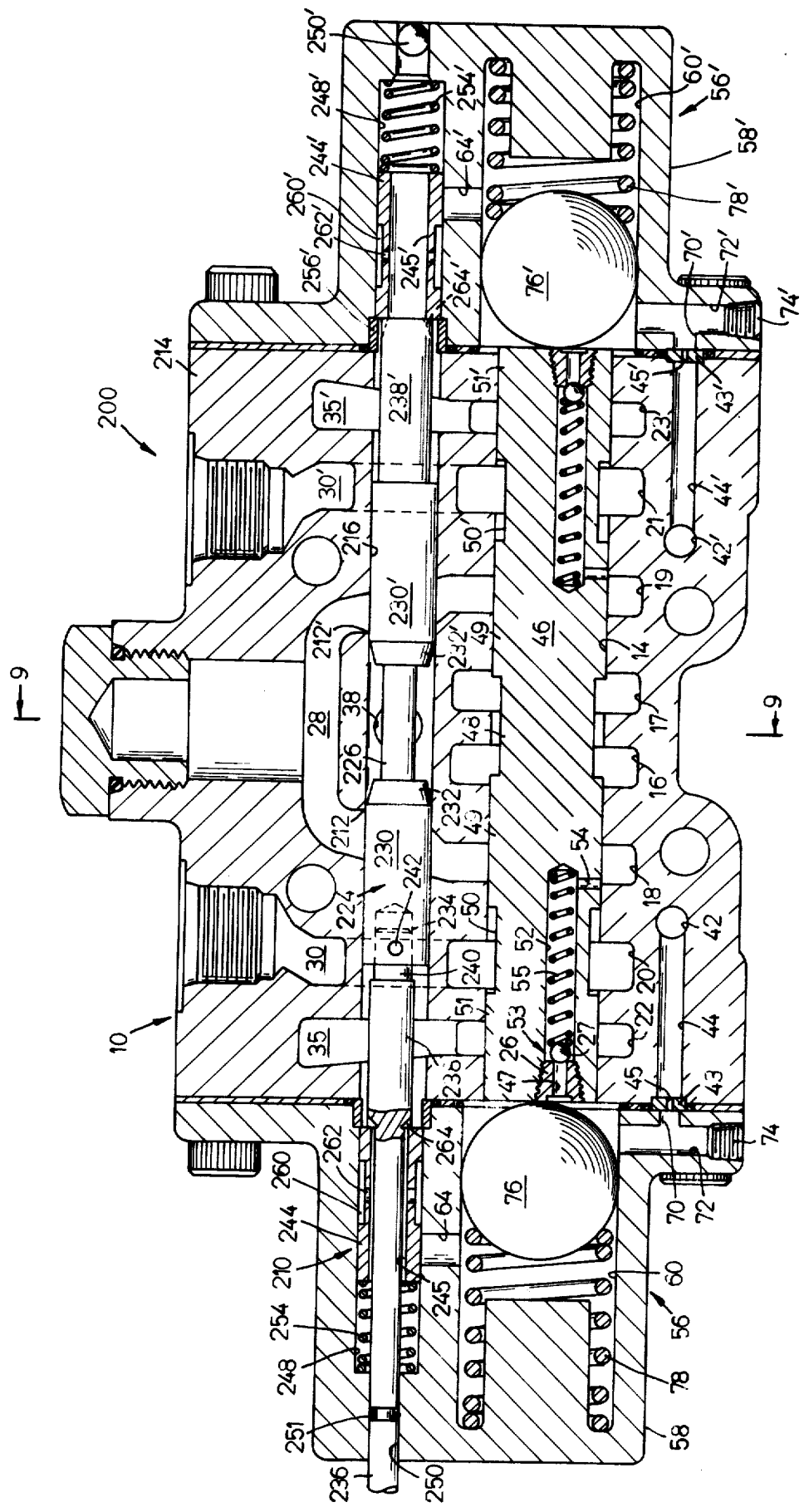
FIG. 8 is a front elevation view taken on section line 8—8 of FIG. 9 showing an alternate embodiment of the invention having a mechanically actuated system for simultaneously controlling the control orifice and the compensating assemblies.
Figure 9:
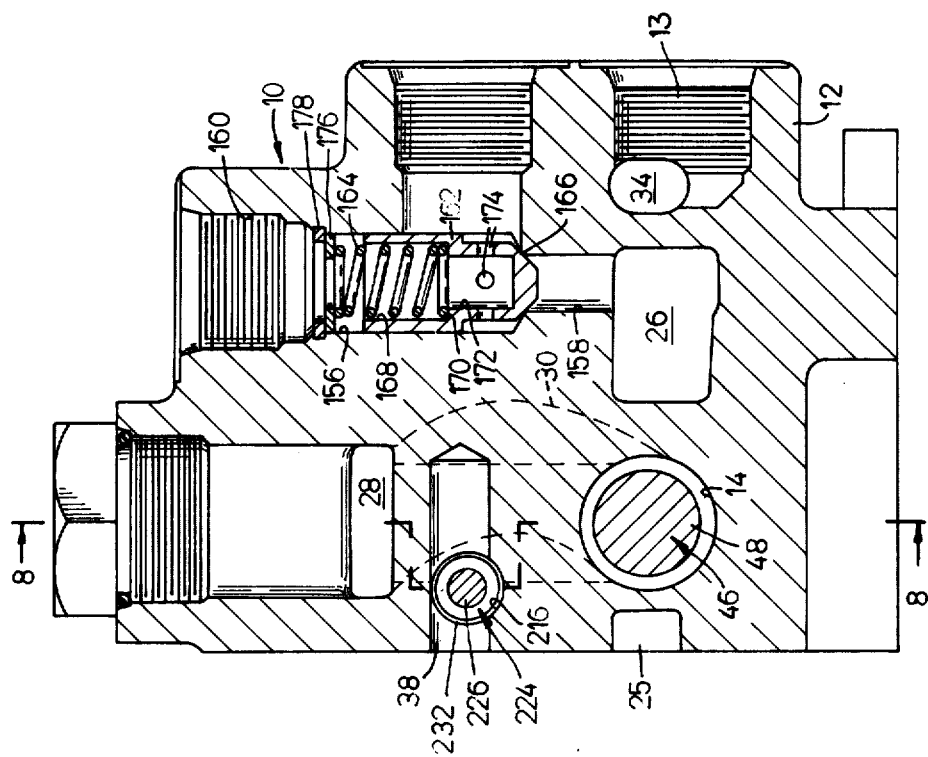
FIG. 9 is a side elevation view taken on section line 9—9 of FIG. 8.

Means are provided for controlling the flow rate of the fluid from the inlet passage network to the pressure passage 28. Such means can be in the form of an electro-hydraulic, proportional assembly 100 as seen in FIG. 1 or a mechanical assembly 180 (FIGS. 6–7) or 210 (FIGS. 8 and 9).

Means are provided for pressure compensating the valve spool 46 to maintain the predetermined or preset maximum flow rate between the inlet passage network 24 and the pressure passage 28. The pressure compensating means, 56, 56' (FIG. 1), are in fluid communication as required with the fluid inlet passage network 24 and the pressure passage 28 so that the valve spool responds to maintain a substantially constant pressure differential between the pressure of the fluid at inlet pressure and at pressure passage pressure.

The Valve Housing

The valve housing 10 is formed from a casting 12 having a cylindrical bore 14 extending through the full length of the casting 12. Four pair of cored annular recesses or wells 16, 17; 18, 19; 20, 21; and 22, 23, are spaced at intervals axially in the bore 14. A fluid inlet passage 25 is connected to one of the first pair of annular recesses 16 and a discharge passage 26 is connected to the other of the first annular recesses 17. A pressure passage 28 is connected at each end to the second annular recesses 18 and 19. A pair of cylinder or output passages 30, 30' are connected to the third pair of annular recesses 20 and 21, respectively. The fourth pair of annular recesses 22 and 23 are connected to reservoir or tank through ports or passages 32 and 32' which are interconnected within the housing 10 by an exhaust passage 34. A blind passage or opening 35, 35' extends upwardly from each of the recesses 22 and 23 at each end of the bore 14. Ports 68 and 68' are connected to the passages 35 and 35', respectively.

Fluid is admitted to the fluid flow control passage 28 through an inlet port 38 connected to the passage 28 by means of a well or bore 40 provided at the inner end of a bore 29 having a threaded section 31 at the open end. A first inlet fluid passage means is provided in the bottom of the casting 12 in the form of a pair of inlet ports 42, 42' which are connected to the inner ends of closed end bores 44 and 44', respectively.

The End Plate

Means are provided for directing fluid into and out of the valve housing 10. Such means is in the form of an end plate 6 which includes the fluid inlet passage network 24 and a discharge or tank passage network 4. More specifically, the end plate 6 includes a cored inlet passage 2 and a pair of cored exhaust passages 3 and 3'. The inlet passage includes an inlet port 5, a pair of outlet ports 7, 7', a through port 8 and a feed port 9. End plate 6 is connected to tank by openings 11, 11'. A pressure relief valve can be provided in a passage between inlet passage 9 and openings 11, 11'.

The end plate 6 is mounted on the valve housing 10, in sealing engagement therewith, with the through port 8 connected to passage 25 and the feed port 9 connected to passage 38. Ports 7 and 7' are connected to ports 42 and 42'. Fluid at inlet pressure fed into port 5 will initially flow through port 8 to the passage 25 and through ports 7, 7' to the compensating assembly through ports 42 and 42'. If the flow through passage 25 is blocked by the movement of the valve spool 46 to an operative position, fluid will be directed to flow through port 9 to the inlet passage 38 as more fully described hereinafter.

Fluid will be discharged from the ports 32, 32' in the valve housing through passage 34 and discharge passage 13. Any appropriate connection can be made between the discharge port 13 and the tank or reservoir.

The Valve Spool

Figure 2:
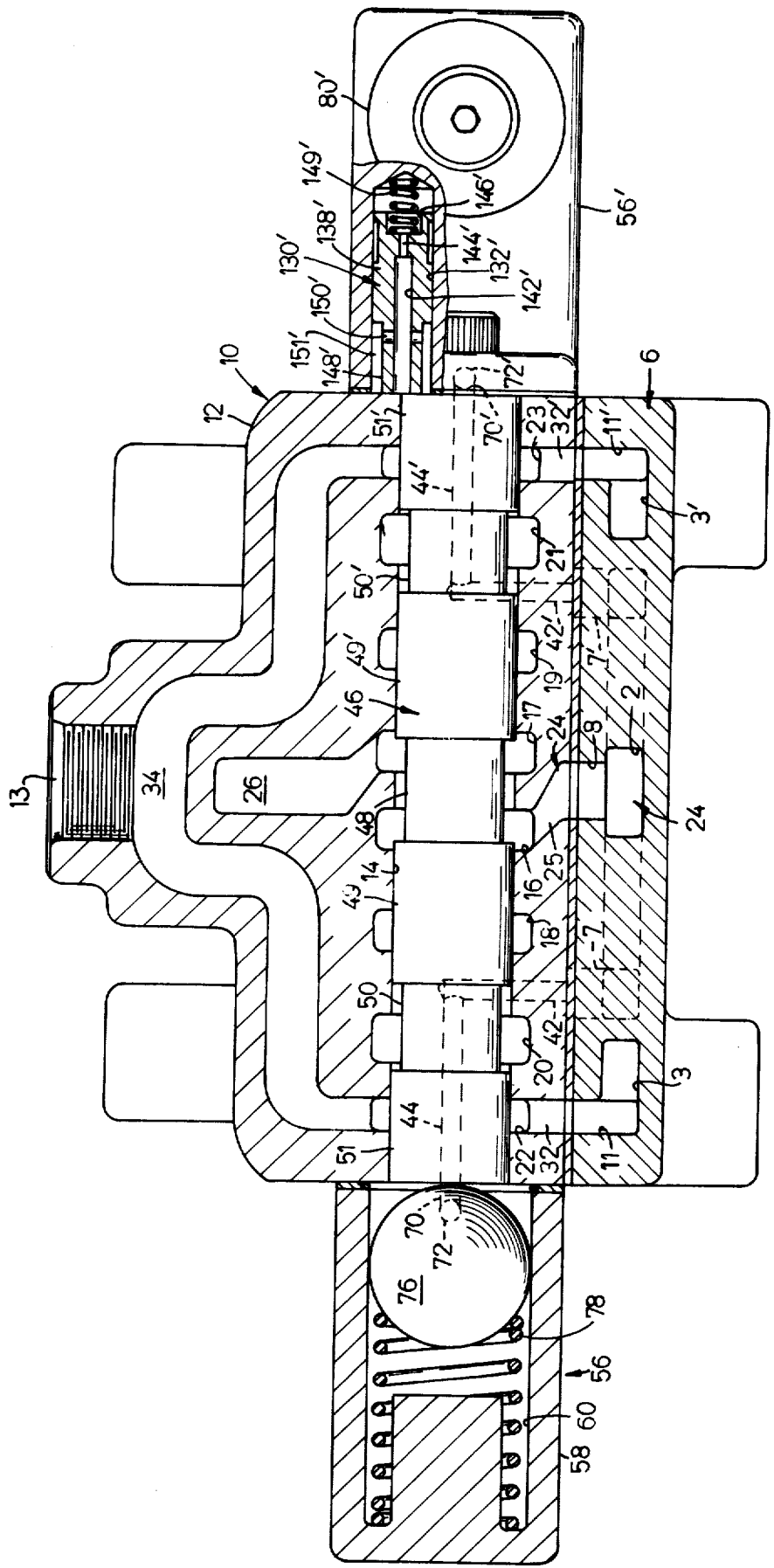
FIG. 2 is a view taken on line 2—2 of FIG. 1 showing the flow paths through the valve housing.

The amount and direction of fluid flow through the valve housing 10 is controlled by means of the valve spool or element 46. As seen in FIGS. 1 and 2, the valve spool 46 includes a centrally located annular recess 48 between lands 49 and 49' and a pair of annular recesses 50, 50' located at equal distances from the central recess 48 between lands 49, 51 and 49', 51', respectively. Blind bores 52, 52' are provided in each end of the valve spool 46, which terminate at their inner ends with ports 54, 54'.

As seen in the drawings, when the valve spool 46 is located in the central or neutral position, the central recess 48 will provide a through passage between the first pair of annular recesses 16, 17. The annular recesses 50 and 50' will be in communication with the third pair of annular recesses 20, 21 which are connected to the cylinder passages 30, 30'.

As the valve spool 46 is moved to the left, the flow path through recess 48 will be gradually restricted as the bore 14 between the annular recesses 16 and 17 is closed. The annular recess 50' will interconnect cored recesses 19 and 21 thereby providing a flow path from the pressure passage 28 to the cylinder passage 30'. The annular recess 50 will interconnect the cored recesses 20 and 22 thereby providing a flow path from cylinder passage 30 to tank through port 32. Movement of the valve spool 46 to the right will reverse the connections and consequently the direction of fluid flow through the housing 10.

Second passage means are provided in the valve spool 46 for equalizing fluid pressure at each end of the valve spool 46 when the valve spool is located in the central or neutral position in bore 14. Such means is in the form of the pair of closed end bores or passages 52, 52' which terminate at their inner ends in the transverse ports 54, 54', respectively. In this regard, when the valve spool 46 is in the central position in the bore 14, the ports 54, 54' will be in fluid communication with the second annular recesses 18 and 19 which are connected to pressure passage 28. A fluid flow path will then exist from one end of the valve spool 46 to the passage 28 through the bore 52, 52' and port 54, 54' into the annular recesses 18, 19 and pressure passage 28.

Load pressures greater than inlet pressures are prevented from passing through the second passage means by means of one-way check valve assemblies 53, 53'. Each of the assemblies 53, 53' includes a spring 55 and ball 27 retained in the bore 52 by a retainer plug 26. The retainer plug 26 includes an orifice 47 which is closed by ball 27. Whenever the spool valve 46 is moved toward an operative position, one or the other of the ports 54, 54' will be blocked and the other port will be connected to the pressure passage 28. The pressure of the fluid in passage 28, if greater than inlet pressure, will be checked so that it cannot act on the end of the valve spool 46 as described hereinafter.

The Pressure Compensating Means

The position of the valve spool 46 is controlled by means of the pressure compensating assemblies 56, 56' provided on each end of the housing 10. Each of the assemblies 56, 56' is identical. The following description will refer to assembly 56, however, it should be understood that assembly 56' includes the same part numbers.

The assembly 56 includes a casting 58 having a closed end bore 60 and a closed end threaded bore 62. The threaded bore 62 is connected to the closed end bore 60 by means of a port 64. The closed end bore 62 is also connected to the opening 35 in the casting 12 by means of a bore or passage 66 in the casting 58 and the connecting port 68 in the casting 12. The closed end bore 60 is connected to the closed end bore 44 in the casting 12 by means of a passage or bore 72 and a connecting passage or port 70. The bore 72 is closed at its outer end by means of a threaded plug 74.

The flow of fluid from the bore 44 through the closed end bore 60 is restricted by piston means in bore 60 in the form of a ball 76 having an outer diameter slightly smaller than the diameter of the bore 60. The clearance around the ball 76 is in the order of 0.0002 to 0.0004 inches. The ball 76 is biased into engagement with the end of the valve element or spool 46 by means of a spring 78 positioned in the closed end of bore 60. Since each of the control assemblies 56, 56' are identical, the springs 78, 78' will provide an equal but opposite force to the ends of the valve spool 46 holding the valve spool 46 in the central or neutral position in the bore 14. The flow of fluid through the bore 44 is restricted by means of a disc 43 positioned between the port 70 and bore 44 and having a reduced diameter orifice 45.

The flow of fluid from the bore 60 to tank is controlled by means of solenoid actuated valve assemblies 80, 80'. In this regard, each solenoid valve assembly 80 includes a housing 82 having a threaded section 84 at one end sealed in the threaded end of the threaded bore 62 by means of an O-ring seal 86 and having an axial opening 85. The upper end of the housing 82 is closed by means of a threaded plug 87 adjustably mounted in a cap 89. A coil 94 is supported in the housing 82 to control the axial motion of an armature 90 positioned in the opening 85 in section 84.

The port 64 is closed by means of a poppet valve element 88 mounted on the inner end of the solenoid armature 90. The armature 90 is biased towards a closed position with respect to the port 64 by means of a spring 92 positioned between the plug 87 and the armature 90. The poppet valve element 88 is opened by energizing solenoid coil 94 to move the armature 90 upward against the bias of the spring 92.

When the port 64 is opened, fluid in the bore 60 will flow through the port 64, bore 62, passage 66 and port 68 to tank through opening 35 and the fourth annular recess 22 in the casting 12. Any drop in pressure in one of the bores 60, 60' will produce a differential pressure across the corresponding ball 76, 76'. When the pressure differential exceeds the bias force of spring 78 or 78', the ball will compress the spring 78 or 78'. The valve spool 46 will follow the motion of the ball 76 due to the force of the spring 78' in the opposite control assembly 56' as described below.

Operation of the Pressure Compensating Means

Assuming solenoid valve 80 on assembly 56 is energized, the poppet valve element 88 will be retracted to vent bore 60 to tank dropping the pressure in bore 60 to tank pressure or near zero. Since fluid at inlet pressure will be acting on the other side of ball 76, the spring 78 will be compressed by the force of the fluid acting on the ball 76. Fluid will continue to flow through the gap around the ball and through valve element 130 (as described hereinafter) into bore 60.

The movement of the ball 76 to the left will allow the spool valve 46 to move to the left due to the force of the spring 78' in the right-hand control assembly 56'. As the valve spool 46 moves, the transverse port 54 at the left side of the spool 46 will be blocked and the transverse port 54' on the right side of the spool 46 will be connected to recess 19. The pressure of the fluid on the left end of the valve spool 46 will approach inlet pressure since port 54 at the end of bore 52 is now blocked and fluid can only escape through the orifice around ball 76. The pressure of the fluid on the right end of spool 46 will drop to a pressure approaching the fluid pressure in the passage 28. This is true because inlet pressure fluid will flow through orifice 45', passages 70' and 72', to bore 60', orifice 47', across ball 53' through passage 52' and passage 54' to passage 28. Since orifice 45' is substantially smaller than any of the passages 47', 52' or 54', the pressure at the right side of spool 46 will be substantially equal to the pressure in passage 28. The differential pressure between the ends of spool 46 is now set by the force on spring 78'; therefore the differential pressure across the control orifice 104 (as more fully described below) is set by spring 78'. The position of spool 46 required to pass the maximum flow rate allowed by the control orifice 104 is determined by the force of the pressure drop from passage 38 to passage 28 which is required to balance the spring 78'.

Valve Assemblies 130 and 130'

Restricted passage means are provided for increasing the flow rate across the ball 76 in order to increase the rate of return to neutral of the valve spool 46. Such means is in the form of a valve assembly 130, 130' provided in a closed end bore 132' in the casting 58' for the control assembly 56'. (Only assembly 130' is described herein although an identical assembly 130 is provided in assembly 56). The closed end bore 132' is connected at its inner end to the bore 60' in the housing 58' by means of a passage 134' which is closed at its outer end by a plug 136'.

The assembly 130' includes a piston 138' positioned in the bore 132' which is biased by means of a spring 149' to an open position. The piston 138' includes an axial bore 142' having a restricted orifice 144' at its inner end which terminates in a recess 146'. The piston 138' is provided with a reduced diameter section 148' at one end which is connected to the bore 142' through ports 150'. The reduced diameter section 148' defines a space 151' in bore 132' which is connected to the open end of the bore 60' by means of a passage 152'.

In the position shown in FIG. 1, fluid at inlet pressure can flow through the passage 152' into the space 151' in bore 132' provided by the annular recess 148'. The fluid will enter the bore 142' through the ports 150' and flow through the restricted orifice 144' into the closed end of the bore 132'. Fluid can then flow from the bore 132' into the bore 60' through the passage 134'.

When the control assembly 56' is activated by venting the bore 60' to tank, the pressure will also drop in the end of the bore 132'. Since the pressure in the annular space 151' is at inlet pressure, the piston 138' will move against the bias of spring 144' restricting the passage 134' such that only the flow rate passed through orifice 144' at a pressure drop set by spring 149' will pass across the right end of spool 138' and out through passage 134'.

The piston 138' will remain in the restricted position until the pressure in the closed end of the bore 132' rises sufficiently to limit the leakage flow through the passage 134' to the bore 60' to that allowed by orifice 144' and spring 149'. As soon as the solenoid 80' is deactivated to close the port 64', flow around ball 76' and flow through valve 138' will cause pressure to build up in the bore 60' as well as in the closed end of the bore 132'. The increase in pressure in the end of bore 132' will move the piston 138' to a fully open position. Fluid will flow directly into the bore 60' from bore 132' until the ball 76' moves the spool 46 back to the neutral position.

Proportional Flow Control Assembly

Figure 4:
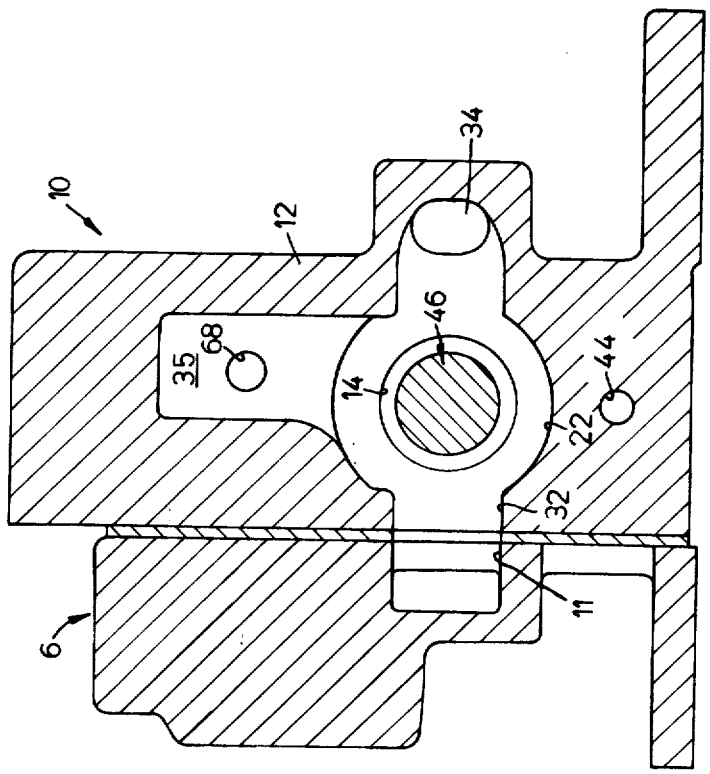
FIG. 4 is a view taken on line 4—4 of FIG. 1 showing the discharge or tank passages.

The fluid flow rate through the four-way valve shown in FIGS. 1 and 4 is controlled by means of the low force proportional solenoid and control valve assembly 100 mounted in the threaded section 31 of bore 29 in the casting 12 and sealed therein by an O-ring seal 33. The assembly 100 includes a poppet valve member 102 and a low force proportional solenoid 118. The valve member 102 is positioned in the bore 29 and has a beveled edge 101 at the end which is positioned to engage the edge or shoulder 103 of the well 40 in the casting 12 to form a control orifice 104.

The valve member 102 provides a means for establishing the flow rate of fluid through the control orifice 104 when flowing from the inlet passage 38 to the pressure passage 28. In this regard, the valve member 102 includes a recess 105 at one end and a flow passage 106 through valve member 102. The passage 106 is connected to the recess 105 through a reduced diameter orifice 108. A second axially extending blind bore 110 is provided in the valve member 102 and is connected at its inner end to passage 28 by a transverse port 112.

Fluid from inlet passage 38 will flow through passage 106 and orifice 108 into recess 105 and out through axial bore 110 and transverse port 112 into passage 28.

The flow of fluid through the bore 110 in the valve member 102 is controlled by means of the low force proportional solenoid 118 which is connected to a pilot valve element 116. The low force solenoid 118 includes an armature 120 mounted for axial movement in a sleeve 123 which extends through coil 124. The current required to move the armature 120 can be adjusted by means of a tubular plug 127 having a threaded section 129 threadedly received in a threaded bore 131 in end cap 133. The gap between the plug 127 and the armature 120 can be varied by turning the plug 127 into or out of the coil 124. The armature 120 is biased by means of a spring 122 toward the valve member 102. The force of the spring 122 can be adjusted by means of a plug 125 threadedly received in a threaded bore 126 in tubular plug 127. A slot is provided in the end of plug 127.

The pilot valve element 116 is supported by the armature 120 with one end positioned to engage the valve member 102 and block passage 110. The other end of the pilot valve element 116 is secured in bore 128 in armature 120. The valve element 116 will move linearly with armature 120 to establish the size of the control orifice 104.

The solenoid 118 is of the low force type and is hydraulically balanced to eliminate any forces acting on the solenoid armature 120 other than the force imposed by the coil 124 and spring 122. In this regard, the valve element 116 is provided with an axially extending bore 115 which provides fluid communication between the intermediate passage 110 and the bore 128. This pressure acts on the top end of the element 116 on an area equal to the area of the end of passage 110, and is opposed by balance piston 229. Piston 229 is connected to plug 125 by means of a universal joint pin 231 positioned in an oversized slot 233 to maintain axial freedom of the piston in bore 128. Pin 231 transmits the load from balance piston 229 to plug 125. The hydraulic forces imposed on the element 116 and armature 120 will then be the same at each end.

Frictional forces have been further reduced by means of a pair of rings of ball bearings 117 provided in annular grooves 119 at each end of the armature 120. The armature 120 has an outer diameter less than the diameter of the inner sleeve 123 in the coil 124 so that any fluid that enters the sleeve 123 will be free to flow to either end of the armature 120.

The valve member 102 is biased to a closed position with respect to the well 40 by means of a spring 114 positioned in the intermediate space 109 between the end of solenoid 118 and valve member 102.

The valve member 102 can be subjected simultaneously to fluid pressures at three different pressures. Inlet fluid pressure in well 40 will act on the first cross-sectional area 99 of the valve member. Fluid in the pressure passage 28 will act on the second cross-sectional area 97 and the fluid in the intermediate space 109 will act on the third or total cross-sectional area 95 of the member 102.

When one of the solenoids 80 or 80' is energized, causing one of the balls 76 to retract, one of the springs 78 or 78' will cause a pressure differential across orifice 104, or between passages 38 and 28. Whenever fluid pressure builds up in the well 40, fluid will flow through passage 106 and orifice 108 into the intermediate space 109. The increase in pressure in the intermediate space 109 plus the bias of spring 114 will prevent upward movement of the valve member 102 since the surface area of valve member 102 acted on by the fluid in the intermediate space 109 is greater than the cross-sectional area of the valve member 102 exposed to inlet pressure in well 40.

The valve member 102 is opened by means of the solenoid 118 which vents the intermediate space 109 to passage 28. In this regard, when a predetermined current is applied to the solenoid coil 124 the armature 120 will be moved a linear distance into coil 124 in proportion to the applied current. The pilot element 116 will be moved away from the valve element 102 exposing the end of the bore 110 in member 102. Fluid in the intermediate space 109 will flow into passage 28 through bore 110 and transverse port 112. The drop in pressure in the intermediate space 109 will increase the pressure differential across the valve member 102. When the force of the pressure differential across valve member 102 exceeds the bias force of the spring 114, the valve member 102 will move upward in bore 29 opening the control orifice 104.

As the valve member 102 moves up and approaches the end of element 116, the flow rate through bore 110 will drop and the pressure in the intermediate space 109 will increase.

When the inlet pressure acting on area 99 plus the pressure passage pressure acting on area 97 equals the force of spring 114 plus the force of the intermediate pressure acting on area 95, the valve member 102 will stop. The orifice 104 will remain at a fixed size until the current is again changed on coil 124 causing element 116 to change position. Since the pressure drop across orifice 104 is set by spring 78 or 78', the flow rate across the orifice 104 will not change when element 116 is in a fixed position. Theoretically, the valve member 102 will never engage the end of the element 116, since the hydraulic pressure in the intermediate space 109 will prevent movement into engagement with element 116.

Figure 3:
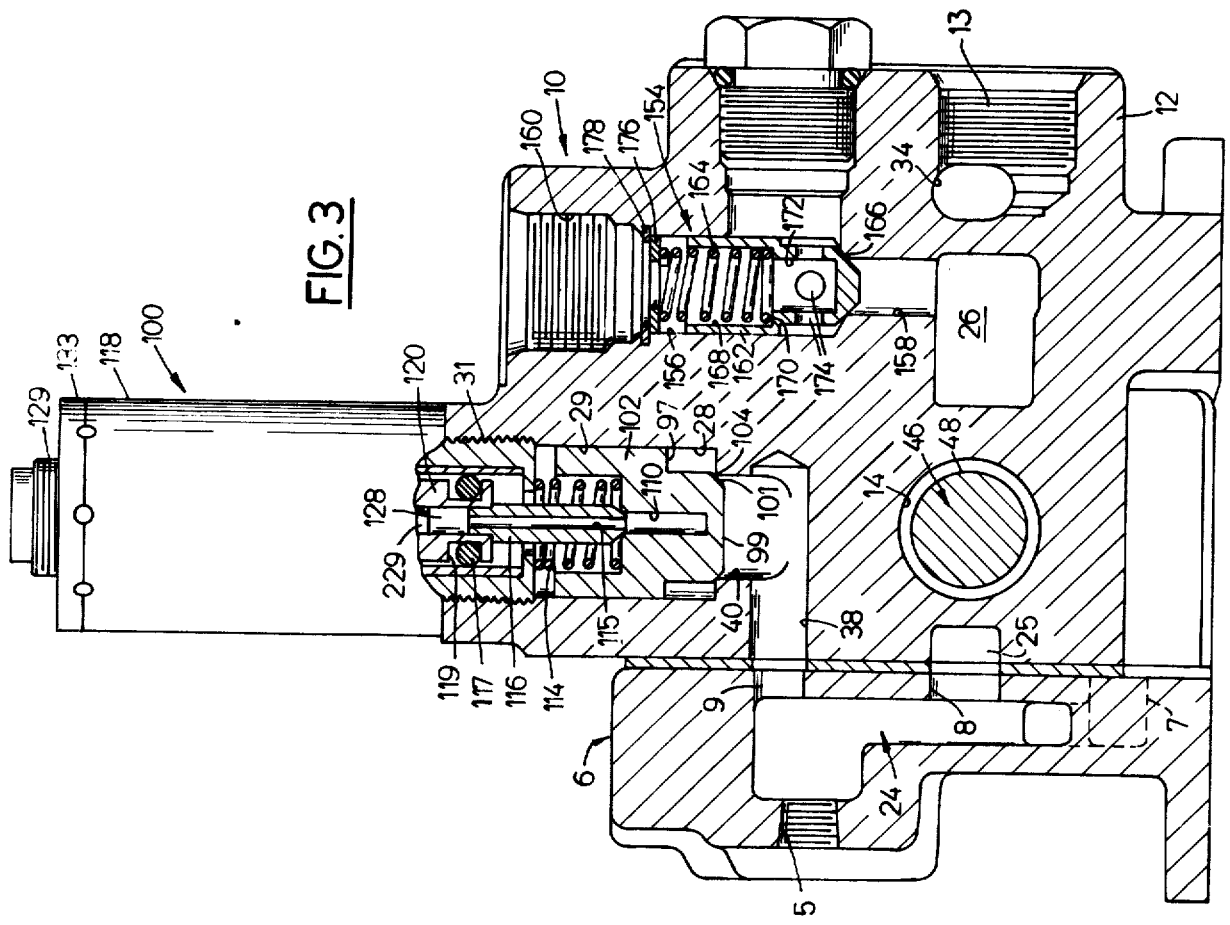
FIG. 3 is a view taken on line 3—3 of FIG. 1 showing the fluid inlet pressure passage.

Minimum Pressure Control (FIG. 3)

The pressure of the fluid flowing through the open center of the valve can be preset by means of a check valve 154 provided in the casting 12. In this regard, the casting 12 includes a bore 156 having a reduced diameter port 158 at its inner end connected to discharge passage 26. The bore 156 includes a threaded section 160 at its open end which can be connected to a return line (not shown). The flow of fluid from the passage 26 through the port 158 is controlled by means of a check valve member 162 positioned in the bore 156 and biased by means of a spring 164 into engagement with the valve seat 166 formed at the end of the port 158. The check valve member 162 includes a central opening 168 which terminates at a shoulder 170. A small bore 172 is provided at the inner end of the bore 168 and is connected to the bore 156 through ports 174. The spring 164 is seated on the shoulder 170 and is retained in the bore 156 by means of a washer 176 and a snap ring 178. The bias of the spring 164 is set to allow fluid to flow through the valve at a minimum pressure of 50 to 100 psi.

Operation

Assuming the valve is pressurized by check valve 162 and the valve spool 46 is in the dead-center position, the hydraulic forces acting on the valve spool 46 will be pressure balanced. The pressure of the fluid in the control assemblies 56 and 56' will be equal on both sides of the balls 76 and 76' so that the only force acting on the valve spool 46 will be the bias force of the springs 78 and 78'. Since the spring bias forces are equal, the valve spool 46 will be centrally located in the axial bore 14.

Assuming the solenoid valve 80 on the left is energized, the corresponding control assembly 56 will be vented to tank. The pressure in the corresponding bore 60 will drop immediately to near zero and the ball 76 will be forced against spring 78 by the pressure of the fluid entering the bore 60 from passage 70. The valve spool 46 will move with the ball 76 due to the force of the spring 78' in the control assembly 56' at the other end of the valve spool 46. The transverse port 54 on the left will close and transverse port 54' on the right will remain open. Fluid in assembly 56' will flow through the bore 52' and port 54' on the right into recess 19 and out through annular recess 50' to passage 30'. The flow into assembly 56' is through orifice 45'. Therefore, the pressure of the fluid at the right end of spool 46 will then drop to approximately the pressure of the fluid in passage 28. The pressure in bore 60' of assembly 56' will remain substantially at the pressure passage pressure. The pressure in bore 60 of assembly 56 will be substantially at inlet pressure since there is not enough flow through passage 64 to cause any appreciable pressure drop across orifice 45 and there is no flow through passage 54.

Whenever the valve spool 46 moves from the center or neutral position, a pressure differential will occur across the valve spool 46 due to the spring force from spring 78 or 78'. The connection of one end of the valve spool 46 to passage 28 through one of the check valves 53 or 53' in passages 52 or 52', respectively, and the connection of the other end of the valve spool to inlet pressure at passage 38 through passages 42, 44, 70 and 72 will cause a fixed pressure differential across orifice 104, fixed by spring 78 or 78'. The position of the valve spool 46 in the bore 14 will stabilize when the inlet and pressure passage pressure differential is sufficient to equal the bias of the spring 78 and a low flow rate through port 54' to port 30' will be established.

In the open center mode, the pressure of the fluid in inlet passage 38 is increased by the movement of valve spool 46 which restricts the flow of fluid between recesses 16 and 17 until inlet pressure is sufficient to establish the necessary flow between passages 38 and 28. In the closed center mode, the valve spool 46 will move until sufficient opening is established between annular recess 18 or 19 and annular recess 50 or 50' to cause the preset flow rate to flow across orifice 104.

When the proportional solenoid 118 is energized, the armature 120 will move a linear distance in direct proportion to the current applied to the solenoid coil 124. The valve element 116 will open bore 110 allowing fluid at inlet pressure in intermediate space 109 to flow through the bore 110 and port 112 into passage 28. The drop in fluid pressure in space 109 will produce a pressure differential across poppet valve member 102. Since the pressure of the fluid in the well 40 is higher, the fluid pressure acting on the bottom of the poppet valve member 102 will cause the valve member 102 to move upward against the bias of spring 114. As the valve member 102 approaches the valve element 116, the flow of fluid from the space 109 will be restricted. The movement of valve member 102 will stop when the pressure differential between the well 40 and space 109 is balanced by spring 114 and intermediate pressure acting on area 95. The size of the control orifice 104 between member 102 and well 40 will establish the flow rate through the valve since the pressure drop is fixed by spring 78 and 78'. The valve spool 46 will automatically adjust as required by changes in pressure at passages 30 or 30' or, if inlet pressure changes as a result of the operation of another valve spool connected in series with spool 46. In order to maintain a fixed flow rate and therefore fixed pressure differential across the control orifice 104, the valve spool 46 must respond to any inlet or outlet pressure variation which occurs at either end of the valve spool 46.

Figure 7:
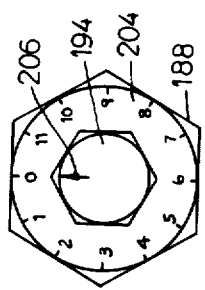
FIG. 7 is a top view of FIG. 6 showing the indicator for the mechanical control assembly.
Figure 6:
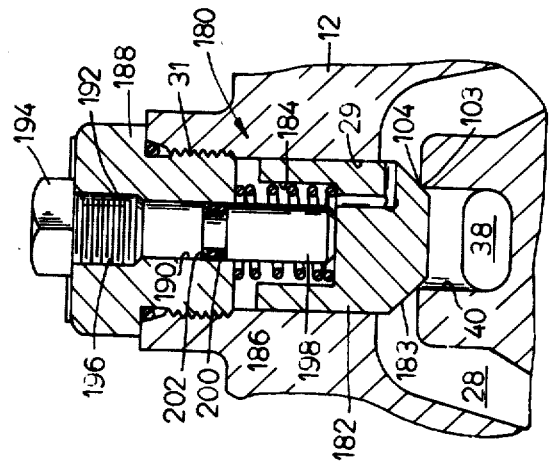
FIG. 6 is a view of an alternate embodiment of the mechanical flow control assembly.
Figure 5:
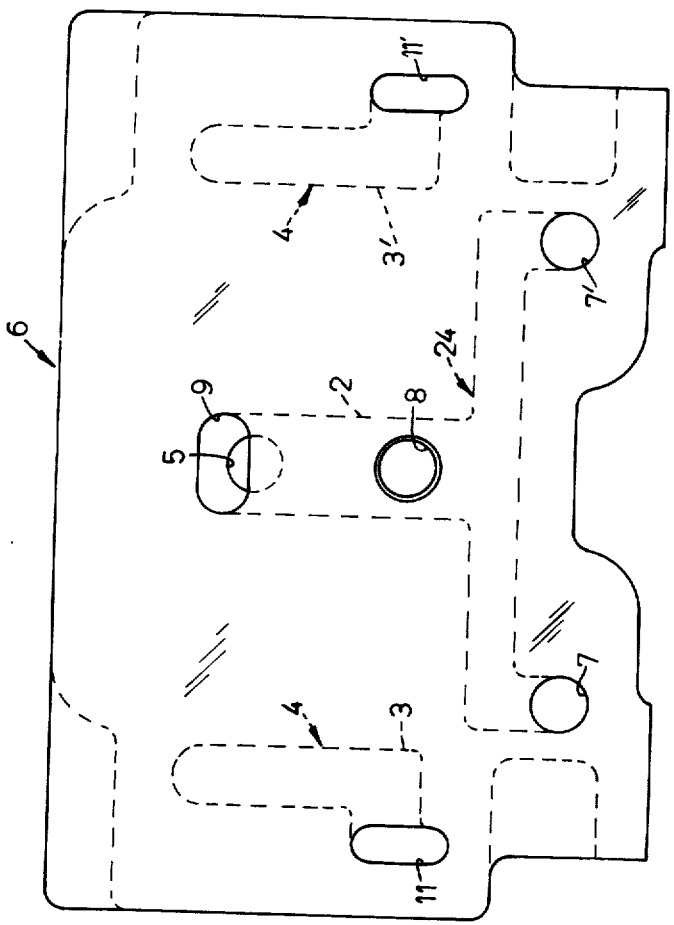
FIG. 5 is an elevation view of the fluid network passage housing showing the inlet and outlet passage connections for the valve housing.

FIGS. 6 and 7

In FIGS. 6 and 7, an alternate embodiment of the invention is shown wherein the proportional solenoid valve assembly 100 has been replaced by a manually adjustable control valve assembly 180. In the drawing, only the control valve asseembly is shown since the remaining elements of the valve are the same as in FIGS. 1–5.

The manually adjustable control valve assembly 180 includes a valve element 182 which is loosely positioned within the bore 29 in casting 12. The valve element 182 includes a recess 184 on one side and a chamfered edge 183 on the other side which is positioned to engage the shoulder 103 of the well 40 to define control orifice 104. The element 182 is biased into engagement with the shoulder 103 by means of a spring 186 positioned in the recess 184 and bearing against a cap 188 threadably received in threaded section 31. The cap 188 includes an axial opening 190 having a threaded section 192.

The position of the valve element 182 is controlled by means of an adjusting screw 194 threadedly received in the threaded section 192. The adjusting screw 194 includes a threaded section 196 and an extension 198 which extends into the recess 184. The extension 198 is sealed within the bore 190 by means of an O-ring 200 positioned within a groove 202 provided in the extension 198.

The size of the control orifice 104 is set by turning the adjusting screw 194 a predetermined amount to provide a fixed stop at the end of extension 198 for the element 182. In this regard, an indicator 204 is provided on the cap 188. The adjusting screw 194 includes an arrow 206 which is rotated to the selected indicia to open control orifice 104 between the valve element 182 and the valve seat 104 the desired amount.

In this embodiment, the flow rate is predetermined by setting the maximum size opening available through the control orifice 104. Once this has been established, the pressure differential across the control orifice 104 will remain constant and the spool valve 46 will automatically compensate for pressure variations in the same manner as described previously.

FIGS. 8 and 9

In the embodiment of the invention shown in FIGS.

8 and 9, the valve 200 is actuated by means of a manually actuated plunger control assembly 210 which simultaneously controls the control assemblies 56, 56' and the fluid flow control orifices 212 and 212'. The means for controlling or pressure compensating the position of the valve spool 46 in the bore 14 in this embodiment of the invention is identical to the control described in FIGS. 1–5. In this regard, the position of the valve spool 46 in bore 14 is determined by the inlet and outlet pressure differential across the control orifices 212 and 212' and the bias force of springs 78 and 78'.

More particularly, the casting 214 includes a control bore 216 which extends through the casting 214 in a parallel relation to the bore 14. The bore 216 intersects the pressure passage 28 and inlet passage 38 to provide fluid communication between the inlet passage 38 and the pressure passage 28. The bore 216 also passes through the tank passages 35 and 35' to provide fluid communication from the pressure compensating assemblies 56 and 56'. The cylinder passages 30 and 30' bypass the bore 216 and are connected only to the bore 14.

The flow of fluid from the inlet pressure passage 38 to the passage 28 is controlled by means of a pilot piston 224 positioned in the bore 216. The pilot piston 224 includes a central reduced diameter rod or section 226 connected at each end to valve members 230, 230'. Each valve member includes a chamfered metering zone 232, 232', respectively. A recess 234 is provided in the end of the valve members 230. The valve chambers 232, 232' are spaced a distance apart less than the distance between the passages 28. Movement of the pilot piston 224 either to the right or to the left will allow fluid under pressure from the passage 38 to pass through the corresponding control orifice 212, 212' formed between the chamfers 232, 232' and the edge of the bore 216 into pressure passage 28.

Venting of the pressure compensating assemblies 56, 56' is controlled by means of control pistons 244 and 244' positioned in bores 248, 248' provided in castings 58, 58'. A small opening 250, 250' is provided at the ends of bores 248, 248'. Each control piston 244, 244' is identical and includes a central bore 245, 245' and an annular recess 260, 260' connected to the bore 245, 245' by ports 262, 262'. The control pistons are biased outwardly from the bores 248, 248' by springs 254, 254' and are retained therein by stop rings 256, 256' provided at the ends of the bores 248, 248'. It should be noted that the control pistons 244, 244' block ports 64 and 64' when biased against stop rings 256, 256'. The ports 64, 64' are vented to tank whenever the pistons 244, 244' are moved into the bores 248, 248' far enough to align the annular recesses 260, 260' with the ports 64, 64'.

The pilot piston 224 is actuated by means of a rod or plunger 236 which extends outwardly through the bore 245 of the control piston 244 and the small opening 250 at the end of the bore 248. The rod 236 is sealed in the bore 250 by means of an O-ring seal 251. An intermediate section 238 having a diameter greater than the bore 245 and the piston 244 is provided at the inner end of the rod 236 and has a number of slots 264 at one end. A small diameter section 240 is provided at the inner end of the section 238 and is positioned in the recess 234 in the pilot piston 224 and is secured thereto by means of a pin 242. An intermediate section 238' is also provided on the end of the valve member 230' and is positioned to engage the pilot piston 244'. A number of slots 264' are provided on the end of the intermediate section 238'.

In operation and assuming the plunger 236 is pulled to the left in FIG. 8, the intermediate section 238 will engage the control piston 244 and push the piston 244 into the bore 248 against the bias of spring 254. The movement of the plunger to the left will move the control piston 224 far enough to the left to open the control orifice 212. The control piston 244 will also be moved far enough to the left to vent bore 60 through port 64 into the annular recess 260 in the piston 244. Fluid vented into the recess 260 will flow through the ports 262 into the bore 245 of the control piston 244 and out through the slots 264 in the section 238 to the tank passage 35. The control piston 244' on the right end will remain in a fixed position against the stop 256' blocking flow through the port 64'.

I claim:

1. A control valve of the type having a body with a valve spool shiftable from a neutral position at which fluid from a fluid inlet passage network flows through the valve to an operating position at which fluid is directed from the fluid inlet passage network to a pressure passage, said pressure passage in the operative position of said valve spool being connected to one of a pair of cylinder passages, the other of said pair of cylinder passages being connected to a tank passage, the valve being characterized by a flow restricting orifice controlled by said valve spool for restricting fluid flow through the valve, valve means for controlling the flow rate between said inlet passage network and said pressure passage, pressure compensating means operatively associated with each end of said valve spool, means for selectively actuating said pressure compensating means for maintaining the flow rate through said valve means to the pressure passage, said compensating means being in fluid communication with said inlet fluid passage network and said pressure passage whereby said valve spool responds to variations in the pressure differential across said valve means to maintain a fixed flow rate through said valve means.

2. The valve according to claim 1 wherein each of said compensating means comprises a compensating assembly at each end of said valve spool, each assembly having a bore, a ball in said bore, and a spring yieldingly urging each of said balls into engagement with the ends of said valve spool, first passage means providing fluid communication between said inlet passage and said bore on one side of said ball, restricted passage means for providing fluid communication across said bore to both sides of said ball, means for venting the bore to tank on the downstream side of said ball and means for selectively opening one of said venting means whereby fluid under inlet pressure acting on said one side of said ball will tend to move said ball against the bias of said spring allowing said valve spool to move in response to the bias of said spring in the other of said compensating assemblies.

3. The valve according to claim 2 including second passage means in said valve spool connecting said compensating assemblies to said pressure passage in the neutral position of said valve spool, one of said second passage means being blocked on movement of said valve spool toward an operating position whereby said one of said assemblies is at inlet pressure and the other of said assemblies is substantially at the pressure of the fluid in said pressure passage.

4. The valve according to claim 3 including means in each of said first passage means for restricting flow whereby said other of said assemblies is maintained substantially at the pressure of said pressure passage.

5. The valve according to claim 3 including means in each of said second passage means for preventing cylinder pressures higher then inlet pressures from being communicated to either of said compensating assemblies.

6. The valve according to claim 1 wherein said valve means includes a poppet valve member positioned to control flow between said inlet passage network and said pressure passage,
means for biasing said member to a closed position with respect to said inlet passage and means for presetting the operating position of said member.

7. The valve according to claim 6 wherein said member includes a first cross-sectional area exposed to inlet pressure and a second cross-sectional area exposed to intermediate pressure, said second cross-sectional area being greater than said first cross-sectional area,
third passage means through said member providing communication between fluid at inlet pressure and fluid at intermediate pressure, said third passage including a restricted orifice,
fourth passage means providing fluid communication between fluid at intermediate pressure and fluid at the pressure of the pressure passage,
and means for restricting flow through said fourth passage means.

8. The valve according to claim 7 wherein said restricting means comprises a valve element operatively positioned for movement into engagement with said valve member to block said fourth passage means and means for selectively moving said valve element a predetermined distance to vary the position of the valve member, whereby the position of said poppet member is stabilized when the force of the fluid at inlet pressure acting on the first area plus the force of the fluid at the pressure of the pressure passage acting on the third surface area equals the force of the fluid at intermediate pressure acting on the second cross-sectional area plus the force of the biasing means.

9. A pressure compensating flow control valve comprising,
a valve body having a bore,
a pair of fluid flow recesses in said bore,
a fluid inlet passage connected to one of said recesses and a tank passage connected to the other of said recesses,
a pair of cylinder passages connected to said bore,
a pair of tank passages connected to said bore,
a fluid pressure passage connected to said fluid inlet passage and to said bore,
a valve spool slidably positioned in said bore for movement in opposite directions from a neutral position wherein the fluid flow recesses are in communication and said cylinder passages and tank passages are closed to an operative position connecting one of said cylinder passages to said pressure passage and the other of said cylinder passages to one of said tank passages, the flow of fluid between said fluid flow recesses being constrained on movement of said valve spool toward the operative position whereby fluid is directed from the fluid inlet passage to flow through said fluid pressure passage,
and fluid pressure compensating means at each end of said valve spool to control the position of the valve spool with respect to said fluid flow recesses, each of said compensating means being selectively in fluid communication with said inlet passage and said pressure passage, whereby the flow rate of fluid is maintained at a fixed rate by compensating for any change in the pressure differential between inlet and outlet pressure.

10. The valve according to claim 9 including valve means between said fluid inlet passage and said pressure passage for controlling the flow rate of said fluid from said inlet passage to said pressure passage.

11. The valve according to claim 9 wherein each of said pressure compensating means includes a housing at each end of said valve body having a cylindrical bore axially aligned with the bore in said body, piston means positioned in said bores, means in said bores for biasing said piston means into engagement with the ends of said valve spool, first passage means connecting each of said bores upstream from said piston means to said inlet passage, and valve means for selectively venting said bores downstream from said piston means whereby said valve spool will move from said neutral position when the force of the inlet fluid pressure acting on said piston means exceeds the bias force of the corresponding spring.

12. The valve according to claim 9 wherein said pressure compensating means includes means for biasing said valve spool to the neutral position and means for applying inlet fluid pressure to one of said biasing means whereby the other of said biasing means will move said spool to the operative position.

13. The valve according to claim 9 including valve means for selectively varying the flow rate between the inlet passage and the pressure passage.

14. The valve according to claim 13 wherein said flow rate controlling means includes a poppet valve and means for selectively establishing a predetermined flow rate through said poppet valve.

15. The valve according to claim 10 wherein said flow rate controlling means includes a poppet valve and a low force proportional solenoid for automatically setting the position of the poppet valve.

16. The valve according to claim 15 wherein said poppet valve includes a first cross-sectional area surface exposed to inlet fluid pressure,
a second cross-sectional area surface exposed to fluid pressure in an intermediate space between said solenoid and said valve,
and a third cross-sectional area surface exposed to fluid in said pressure passage,
and means for biasing said valve to a closed position with respect to said fluid inlet passage whereby said valve opens when the force of said fluid at inlet pressure acting on said first cross-sectional area is sufficient to overcome the force of said biasing means.

17. The valve according to claim 16 wherein said poppet valve includes a first restricted flow passage providing fluid communication between said inlet passage and said intermediate space, and a second passage providing fluid communication between said intermediate space and said pressure passage, said solenoid including a pilot valve element positioned to control the flow of fluid through said second passage whereby the flow rate between said inlet fluid passage and said pressure passage is controlled by the flow rate between the intermediate space and said second passage.

18. The valve according to claim 17 wherein said solenoid includes an armature for supporting said valve element, means for biasing said armature to a closed position with respect to said valve, and means for controlling th force required to move the armature.

19. A pressure compensated flow control valve comprising a valve body, a bore through said valve body, a fluid inlet passage connected to said bore, a pair of cylinder passages in said body connected to said bore, a proportional force flow control assembly connected to control the fluid flow rate between the fluid inlet passage and said cylinder passage, said assembly including a poppet valve member positioned to provide a flow control orifice between said inlet passage and said cylinder passages, and a low force proportional solenoid operatively connected to control the linear motion of said valve member to establish the size of the control orifice, an exhaust passage connected to said bore, a valve spool slidably positioned in said bore for movement from a neutral position wherein said cylinder passages are closed to an operative position wherein one of said cylinder passages is connected to said fluid inlet passage and the other of said cylinder passages is connected to said exhaust passage, means for biasing said valve spool to a neutral position, and passage means for applying the fluid pressure differential between the pressure of the fluid in the inlet passage and the cylinder passage to said biasing means whereby said valve spool will assume a stable position in the bore in said body when the pressure differential force equals the bias force.

20. The control valve according to claim 19 wherein said valve body includes a second bore, a plunger assembly in said second bore, said assembly including a pilot piston to control the flow rate between the inlet passage and the cylinder passage, and a control piston positioned for movement between a neutral position wherein said valve spool is pressure balanced to an operative position wherein said fluid pressure differential applying means is in fluid communication with said inlet passage and said cylinder passage.

21. A pressure compensated flow control valve comprising: a valve body, a bore through said valve body, a fluid inlet passage connected to said bore, a pressure passage connected to said fluid inlet passage and to said bore on each side of said inlet passage, a pair of cylinder passages in said body connected to said bore at points spaced axially from said pressure passage, a pair of exhaust passages connected to said body at points axially spaced outwardly from said cylinder passages, a valve spool slidably positioned in said bore for movement from a neutral position wherein said fluid from said inlet passage flows through said bore and said cylinder passages are closed to an operative position wherein fluid flow from said inlet passage is restricted to flow through said pressure passage, one of said cylinder passages being connected to said pressure passage and the other of said cylinder passages being connected to said exhaust passages, means for controlling the flow rate of fluid from said inlet passage to said pressure passage, and pressure compensating means for biasing said valve spool to a neutral position, said compensating means being in fluid communication with said inlet passage and said pressure passage wherein the fluid pressure differential between said inlet passage and said pressure passage will determine the position of the valve spool.

22. The valve according to claim 21 wherein said controlling means includes a poppet valve member positioned to control flow between said inlet passage and said pressure passage, a spring for biasing said member toward the closed position, and means for selectively adjusting the force of said spring.

23. The valve according to claim 21 wherein said controlling means includes a pilot piston having a pair of valve seats positioned for movement to operative positions with said pressure passage, and a pair of control pistons positioned to control said pressure compensating means.

24. The valve according to claim 21 wherein said controlling means includes, a poppet valve member, and a low force proportional solenoid assembly for controlling the position of the poppet valve element.

25. The valve according to claim 24 wherein said solenoid assembly is hydraulically pressure balanced.

* * * * *